(12) United States Patent
Ganachaud

(10) Patent No.: US 7,318,462 B2
(45) Date of Patent: Jan. 15, 2008

(54) CLOSURE DEVICE FOR A FILLER PIPE OF A TANK FOR LIQUID, TANK EQUIPPED WITH SUCH A DEVICE

(75) Inventor: Patrick Ganachaud, Laval (FR)

(73) Assignee: Inergy Automotive Systems Research (Société Anonyme), Brussels (BE)

( * ) Notice: Subject to any disclaimer, the term of this patent is extended or adjusted under 35 U.S.C. 154(b) by 1 day.

(21) Appl. No.: 10/577,925

(22) PCT Filed: Oct. 22, 2004

(86) PCT No.: PCT/EP2004/052617

§ 371 (c)(1),
(2), (4) Date: May 1, 2006

(87) PCT Pub. No.: WO2005/049360

PCT Pub. Date: Jun. 2, 2005

(65) Prior Publication Data
US 2007/0074785 A1    Apr. 5, 2007

(30) Foreign Application Priority Data
Oct. 31, 2003  (FR)  .................................. 03 12782

(51) Int. Cl.
B65B 1/04 (2006.01)
(52) U.S. Cl. ...................... 141/350; 141/301; 141/382; 220/86.2
(58) Field of Classification Search ................ 141/301, 141/312, 348–350, 382; 220/86.2
See application file for complete search history.

(56) References Cited

U.S. PATENT DOCUMENTS 3,845,877 A * 11/1974 Arnett et al. ............... 220/86.2
5,435,358 A *  7/1995 Kempka et al. ............ 141/312

(Continued)

FOREIGN PATENT DOCUMENTS

DE    199 15 241    10/2000

(Continued)

OTHER PUBLICATIONS

U.S. Appl. No. 10/577,925, filed May 1, 2006, Ganachaud.

(Continued)

Primary Examiner—Timothy L. Maust
(74) Attorney, Agent, or Firm—Oblon, Spivak, McClelland, Maier & Neustadt, P.C.

(57) ABSTRACT

A closure device for a filler pipe of a tank intended to contain a liquid, the device including a valve that includes a valve body in communication with the pipe and a plug that can be moved in the valve body between a closed position and an open position of the valve. The body of the valve includes an inlet opening closed off by a flap that can be moved between an open position and a closed position, and an outlet opening. The flap is connected to the plug by a coupling such that a thrust exerted on the flap by a tubular end of a nozzle for admitting liquid into the tank causes the flap to tilt into the valve body and the plug to rotate, placing a cylindrical opening in the plug in alignment with inlet and outlet openings in the valve body.

10 Claims, 3 Drawing Sheets

U.S. PATENT DOCUMENTS

| | | | |
|---|---|---|---|
| 5,465,861 A * | 11/1995 | Kunz et al. | 220/260 |
| 5,732,842 A * | 3/1998 | Krause et al. | 220/254.1 |
| 5,901,760 A * | 5/1999 | Parker et al. | 141/312 |
| 5,908,130 A * | 6/1999 | Chang | 220/254.4 |
| 5,931,206 A * | 8/1999 | Simdon et al. | 141/312 |
| 6,446,685 B2 * | 9/2002 | Stiegler et al. | 141/301 |
| 6,539,990 B1 * | 4/2003 | Levey et al. | 141/301 |
| 7,011,121 B2 * | 3/2006 | Bar et al. | 141/350 |
| 7,055,560 B1 * | 6/2006 | Sexton | 141/350 |
| 7,082,973 B2 | 8/2006 | Ganachaud et al. | |
| 2004/0144443 A1 | 7/2004 | Ganachaud | |
| 2005/0205156 A1 | 9/2005 | Ganachaud et al. | |

FOREIGN PATENT DOCUMENTS

| | | |
|---|---|---|
| DE | 199 19 251 | 11/2000 |
| FR | 2 861 655 | 5/2005 |

OTHER PUBLICATIONS

U.S. Appl. No. 11/438,430, filed May 23, 2006, Ganachaud et al.
U.S. Appl. No. 11/559,414, filed Nov. 14, 2006, Ganachaud.

* cited by examiner

CLOSURE DEVICE FOR A FILLER PIPE OF A TANK FOR LIQUID, TANK EQUIPPED WITH SUCH A DEVICE

FIELD OF THE INVENTION

The invention relates to tanks intended to contain liquids, more especially to closure devices for filler pipes of such tanks.

PRIOR ART

Liquid-fuel tanks equipping motor vehicles are subject to strict pollution standards. Both national legislation particularly in the United States) and European legislation impose rigorous constraints on motor vehicle manufacturers with regard to sealing the tanks to the emission of vapours. Owing to the considerable volatility of certain fuels used, these constraints are difficult to observe, especially at the level of the closures for the filler pipes of the tanks. Moreover, conventional methods for supplying the tanks generally make use of nozzles equipped with tubular ends that are inserted momentarily (the filling time) into a corresponding pipe of the tank. These filling methods inevitably lead to vapour emissions which may be toxic for the users and dangerous for the surroundings, especially as regards the risks of explosion and fire that they generate.

Currently, filler pipes for the liquid-fuel tanks of motor vehicles are usually closed using a removable cap. In the closed position, the cap is secured to the pipe by being screwed onto a threaded connector of the pipe or by means of a bayonet assembly, sealing being provided by the compression of an elastic seal. This closure method has the disadvantage of requiring a considerable force on the part of the user to fasten the cap on the pipe and compress the seal. Consequently, there is a risk that the cap will be poorly positioned on the pipe, allowing toxic vapours to escape from the tank into the surrounding atmosphere. Furthermore, it is possible that the cap may be lost or forgotten with this kind of system.

To overcome this disadvantage, document U.S. Pat. No. 5,901,760 proposes a closure device integrated into the filler pipe for the tank. This closure device comprises a plug valve comprising a valve body, fixed to the free end of the pipe, and a spherical or cylindrical plug which is able to move inside the valve body. The valve body is pierced with an orifice for the insertion of a tubular end of a nozzle for filling the tank. A means which can be operated by hand or coupled to a motor allows the plug to be pivoted in the valve body between an open position, in which the pipe is placed in communication with the aforesaid orifice in the valve body by way of a cylindrical opening made in the plug, and a closed position in which the plug forms a sealed obstacle between the said pipe and the said orifice.

This known device has the disadvantage of requiring the user to manoeuvre the plug in order to open or close the valve. Consequently, it is not possible to avoid the fact that the user may forget to close the valve again after filling and that vapours will escape from the tank as a result. This is a particularly major disadvantage when the liquids used are volatile, which is usually the case with the fuels used for propelling automobile road vehicles.

SUMMARY OF THE INVENTION

The invention aims to overcome the disadvantages set out above affecting known closure devices by providing a closure device which effectively closes off the tank and prevents volatile emissions both during and after the operations of filling this tank.

Consequently, the invention relates to a closure device for a filler pipe of a tank intended to contain a liquid, the said device comprising a valve which comprises a valve body in communication with the pipe and a plug which can be moved in the valve body between a closed position and an open position of the valve, in which device:

the body of the valve comprises an inlet opening closed off by a flap which can be moved between an open position and a closed position, and an outlet opening; and the flap is connected to the plug by a coupling means in such a way that a thrust exerted on the flap by a tubular end of a nozzle for admitting liquid into the tank causes the flap to tilt in the casing of the valve and the plug to rotate, placing a cylindrical opening in the said plug in alignment with inlet and outlet openings in the valve body.

In the device according to the invention, the tank consists of a closed vessel, the shape of which is not critical. The tank must normally be made of a material which is sealed and chemically inert to the liquids for which it is intended, for example to the volatile liquid fuels derived from petroleum which are used for automobile propulsion. Examples of liquids which can be used in the tank to which the invention relates comprise fuels for supplying the heat engines of motor vehicles, in particular petrol and diesel oil, organic liquids used as fuel or as oxidizer for supplying fuel cells intended for generating an electric current. Materials which can be used for producing the tank especially comprise metals (particularly steel) and plastics. Use is advantageously made of polymers and copolymers derived from olefins, particularly ethylene. Polyethylene, in particular high density polyethylene (HDPE) is especially recommended in the case of tanks intended for volatile combustible liquids derived from petroleum.

The shape of the tank and its dimensions are not critical and depend essentially on the use for which it is intended. The tank may be equipped with internal or external accessories or accessories which pass through its wall.

The tank is in communication with a pipe serving to introduce therein a liquid of the type defined above. The pipe must normally be made of a material which is sealed and chemically inert to the liquids intended for the tank. It may generally be made from the same material as the tank.

The valve is used to close off the pipe in order to isolate the tank from the outside. The valve is a plug valve comprising a valve body (or casing) in which a plug is able to move. This casing advantageously consists of two assembled components, which makes it easily possible to mount the plug and all the possible accessories of the valve within it.

Plug valves are well known and widely described in the technical literature. In the plug valve of the device according to the invention, the shape of the valve is not critical. This plug is generally a body of revolution which can be operated by rotation about an axis of revolution. It may, for example, have a cylindrical, fustoconical, conical, spherical, hemispherical or ovoid shape. It is pierced with a cylindrical opening which, in the open position, allows a nozzle end to be inserted, this insertion being impossible when the valve occupies its closed position.

The plug and the valve body are preferably made of a material which is chemically inert to the liquids used in the tank.

The plug valve must be designed according to the liquids used in the tank so as to produce a sealed closure of the pipe when the valve is in the closed position. It is preferably designed so as to be sealed to the said liquids and to the vapours that these liquids generate in the tank.

In the device according to the invention, the valve body is pierced with two openings (an inlet opening and an outlet opening) which are aligned with the cylindrical opening in the plug when the valve is in the open position.

According to the invention, the inlet opening in the valve body is closed off by a flap which can move between an open position and a closed position, the effect of the flap being to respectively open/close the valve and additionally to protect the valve (particularly the valve body and the plug) from dust, the weather and the risk of theft. This flap is advantageously combined with a seal. The inlet flap is connected to the plug by a coupling means which is designed so that the flap and the plug simultaneously occupy their respective closed position on the one hand and open position on the other hand. Therefore, according to the invention, the respective movements of the flapper and the plug are interconnected. The respective opening and closing of the flap automatically bring about the respective opening and closing of the plug valve.

To this end, in a particular embodiment, the coupling means comprises two engaging pinions, one of the pinions being secured to the plug and the other pinion being secured to the flap. In this embodiment, rotation of the flap about its pivot automatically causes corresponding rotation of the plug in the valve body by way of the two pinions. In this way, a thrust exerted on the flap by the tubular end of a fuel-admitting nozzle duly causes the flap to tilt in the casing of the valve and the plug to rotate, placing a cylindrical opening in the said plug in alignment with inlet and outlet openings in the casing of the valve.

In the device according to the invention, it is often advantageous to provide a locking mechanism, which may be a lever fixed to the plug and operated directly (in the vicinity of the said mechanism) or from the cabin of the vehicle and which prevents access to the tank, for example by inhibiting the movement of the inlet flap. Locking and unlocking of this flap may be achieved manually or by way of an electric motor or an electrically, electromagnetically or manually operated actuator (cylinder type).

This locking system may be combined with the locking of the vehicle doors, for example. Such a system makes it possible to contribute effectively to the impregnability of the system. Furthermore, the opening, closing and locking functions combined in a single component allow considerable economic savings to be made and facilitate assembly on the vehicle.

Vehicles are most often provided, for aesthetic reasons mainly, with a lid which masks the inlet of the fuel circuit and has a centralised locking means. With the locking system according to the advantageous variant described above, the lid is no longer to be provided with a locking function and may then be opened manually, making it possible, for example, to clean the bowl by means of a high-pressure cleaner.

Thus, as stated above, the valve body of the device according to the invention also comprises an outlet opening. According to an advantageous variant, this opening is closed off by a "ULP" (unleaded petrol) flap and the diameter of this opening is then such as to allow the nozzle to be inserted as far as this flap (to tilt it into the open position) only if the nozzle dispenses unleaded petrol (the regular-petrol nozzles having a larger diameter, resulting in security against misfuelling). According to this variant, therefore, the ULP flap is normally in the closed position and it is only caused to open by the insertion of a nozzle spout of suitable diameter. Particularly advantageously, the ULP flap will also cooperate with an appropriate device (seal) which contributes to sealing the assembly as long as the said flap is closed.

In the device according to the invention, the valve body and the flap or flaps may be made of any material capable of withstanding the chemical, mechanical and thermal stresses to which the device according to the invention is normally subjected. In the case of a motor vehicle, they may generally be made of metal (generally steel), polyacetal or polyester (preferably reinforced, for example glass-fibre reinforced, polyester). The flaps may have any shape compatible with the use thereof in order to allow access to the valve. For example, they may have a square, rectangular, circular, oval or parallelepipedal shape, square, rectangular and circular shapes generally being well-suited.

According to another variant of the invention, used, where appropriate, in combination with the above-described variants, the device comprises, in addition to the plug valve, a seal (termed main seal) which is arranged in the valve and is situated in the continuation of the pipe when the plug occupies its open position defined above.

In this variant, the (main) seal has the function of providing sealing between the pipe of the tank and the tubular end (or spout) of a cock or nozzle for admitting liquid into the tank and, in so doing, of isolating the tip of the nozzle end and the interior of the tank from the immediate atmosphere upstream of the head of the pipe. In fact, when the device according to the invention comprises a ULP flap as defined above, it is when this flap is open that the main seal is in contact with the walls of the filling end and that the system is then sealed by this means.

To this end, the seal is normally designed to provide a sealed and momentary junction between the pipe and the tubular end while the tubular end of the nozzle is inside the pipe of the tank. The seal is additionally normally designed to allow rapid engagement of the nozzle end in the pipe of the tank as well as its rapid disengagement from the said pipe. To this end, in a particularly preferred embodiment of the device according to the invention, the seal is elastic. In this embodiment of the invention, the seal is advantageously made from an elastomeric material or from an expanded polymer.

In the device according to this variant of the invention, the seal must be made from a material which is chemically inert to the liquids intended for the tank and which is impermeable to the said liquids and, in the case of volatile liquids, to the vapours that these generate.

Notwithstanding the aforementioned structural characteristics, the shape and the composition of the seal are not critical. For example, the seal may advantageously comprise a flexible sleeve (made from an elastomer for example). This embodiment of the seal is well suited to the passage of the tubular end of the nozzles which are commonly used for filling motor vehicle fuel tanks. In this embodiment, the sleeve is provided over its outer portion with elastic reinforcements which tend to reduce the diameter of the sleeve and to press it in a sealed manner against the outer surface of the tubular nozzle end when this is inserted into the tank.

Another particular embodiment of the seal which has given good results is that in which this seal is made from a flexible elastomeric material including two elements, one of which, situated on the upstream side, consists of a plurality of circular lips which fold down onto the outer surface of the filler nozzle end, and the other of which, situated on the downstream side, comprises a shutter which opens under the effect of a thrust exerted by the nozzle end. The terms upstream and downstream are defined according to the direction of flow of the liquid in the pipe while filling the tank. A seal with two circular lips has given good results.

In this particular embodiment of the seal, the shutter may consist of a flattened circular piece made of elastomeric material and split radially from its centre into a plurality of circular sectors, forming a star, these sectors when placed one against the other in the rest position forming a gas-tight and liquid-tight closure. A seal with four quarter-sectors has given excellent results.

Patent Applications WO 02/072377 and FR 02.11465 [INERGY AUTOMOTIVE SYSTEMS RESEARCH (SOCIETE ANONYME)] give examples of seals which can be used in the device according to this variant of the invention.

Still according to this variant of the invention (device with seal), the seal may be situated permanently in the body of the valve in alignment with the filler pipe.

In a particular embodiment of the device according to this variant of the invention, the seal can be retracted in the sense that it is not in alignment with the pipe when the plug occupies its closed position defined above.

In a particularly preferred variant of this embodiment of the invention, the seal is fixed to the plug. In particular, the seal may be fixed in the opening in the plug which extends the pipe of the tank when the plug occupies its normal valve-opening position. This embodiment of the invention has the advantageous feature that the seal is not in contact with the liquid or vapours of the tank when the plug is in the closed position. The mechanical and chemical stresses on the seal are thereby reduced, which constitutes an advantage of reliably maintaining its elastic properties.

It should be noted that in certain advantageous variants the device according to the invention comprises seals other than that mentioned above. For example, it may comprise a seal providing sealing between the plug and the valve body, auxiliary seals collaborating with any flaps, etc.

The device according to the invention is directed towards any type of tank intended to contain a liquid. It is especially directed towards tanks intended to contain volatile liquids, especially those liable to form toxic or dangerous, for example inflammable, vapours. The device according to the invention thus ensures safe and efficient handling and storage of such fuels, not only with respect to the users but also with respect to the environment.

The device according to the invention is very especially directed towards liquid-fuel tanks equipping vehicles having internal combustion engines, in particular towards tanks equipping these vehicles and intended to contain petrol, kerosene, diesel oil, alcohol or liquefied gas.

The invention thus also relates to a liquid-fuel tank for a vehicle with an internal combustion engine, the said tank being equipped with a device according to the invention.

The tank according to the invention may advantageously be equipped with a safety system in relation to degassing the tank during its filling and its venting during normal rest and operating periods of the engine. A safety device of this type is described in document WO 02/072377[INERGY AUTOMOTIVE SYSTEMS RESEARCH (SOCIETE ANONYME)].

The vehicles towards which the invention is directed comprise road vehicles, railway traction units, boats, aircraft and industrial handling equipment. The invention is very especially directed towards road vehicles for the transportation of people and goods, particularly towards motor cars, lorries and public vehicles for transporting people.

BRIEF DESCRIPTION OF THE FIGURES

The figures are not drawn to scale. Generally, like reference numbers denote identical elements.

DETAILED DESCRIPTION OF A PARTICULAR EMBODIMENT

Figure 1:
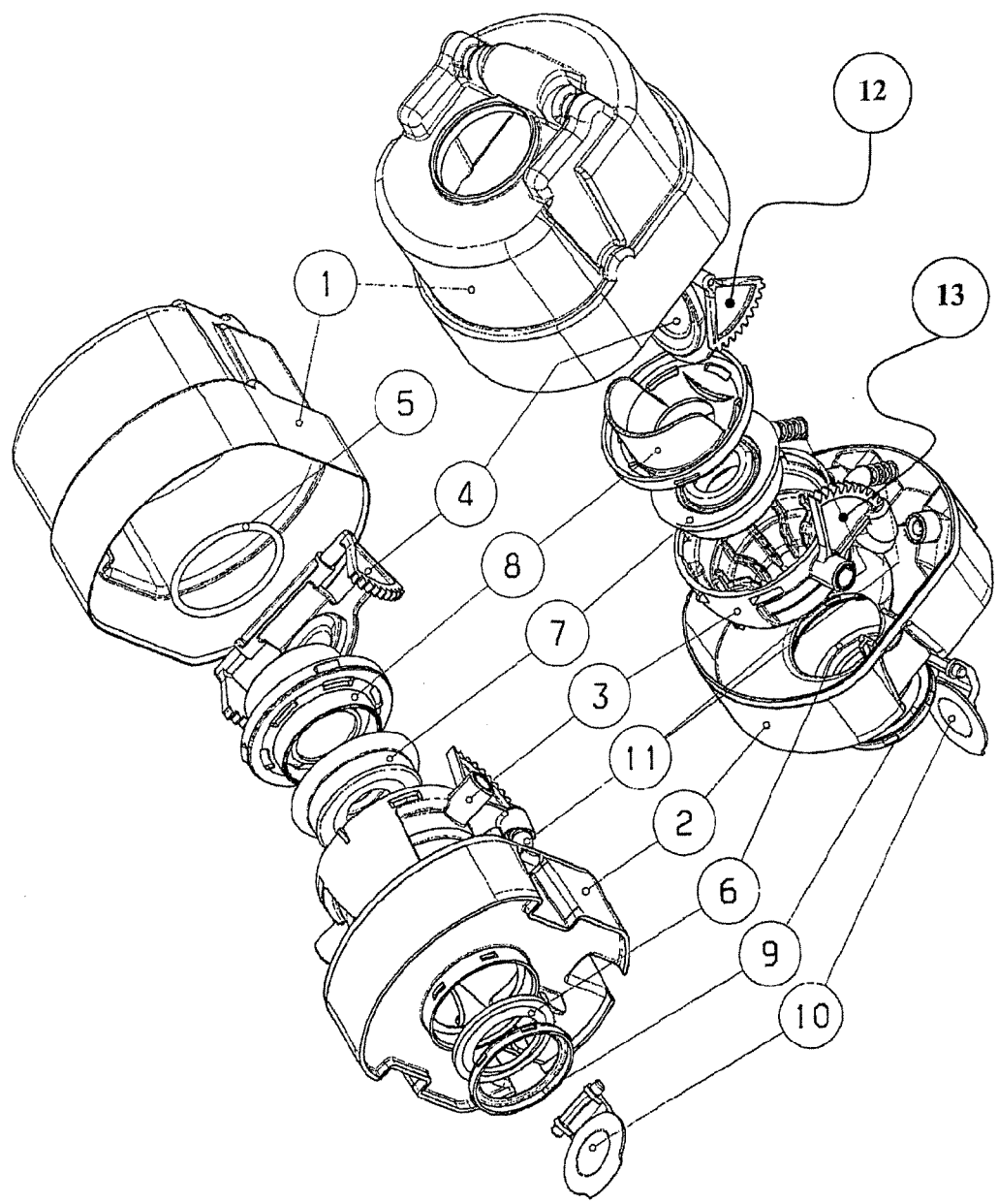
FIG. 1 shows an exploded view of all the constituent parts of a device according to a particular embodiment of the invention before their assembly.

The figures thus represent a closure device according to the invention, connected at one end of a pipe, the other end of which is connected to a tank (not shown). The device equips a motor vehicle whose tank normally contains a volatile liquid fuel, for example petrol. The device is especially designed for motor vehicle tanks which are supplied by means of a filler nozzle of the type with which public service station pumps are usually equipped.

The device comprises a valve having a body or casing composed of 2 parts: an upper casing 1 and a lower casing 2, the said casing containing a hemispherical plug 3. It also comprises an inlet flap 4 which cooperates with an inlet seal 5. The plug 3 is in the lower casing 2, in contact with a spherical seal 6. It should be noted that a similar seal (not shown) may be present between the plug 3 and the upper casing, such a system comprising a double spherical seal providing increased sealing.

The plug 3 includes a seal 7 which is intended to match the tip of a filler spout and is fixed to an inlet cone 8 delimiting the opening in the plug through which the nozzle is inserted when the plug is in the open position. This seal is formed by a sleeve fitted with external elastic reinforcements which, at rest, tend to reduce the passage diameter of the seal. The lower end of the lower casing 2 is provided with a cover 9 covering the seal 6 and intended to retain it in its housing. The inlet flap 4 is coupled to the plug 3 by a device comprising two return springs 11 and two pinions 12 and 13 fixed respectively to the flap 4 and to the plug 3.

The seal 6 may be produced using flexible materials but also using more rigid materials like Teflon®, for example. By contrast, the seal 7 must be based on flexible materials since it has to take up relatively large play.

Figure 2:
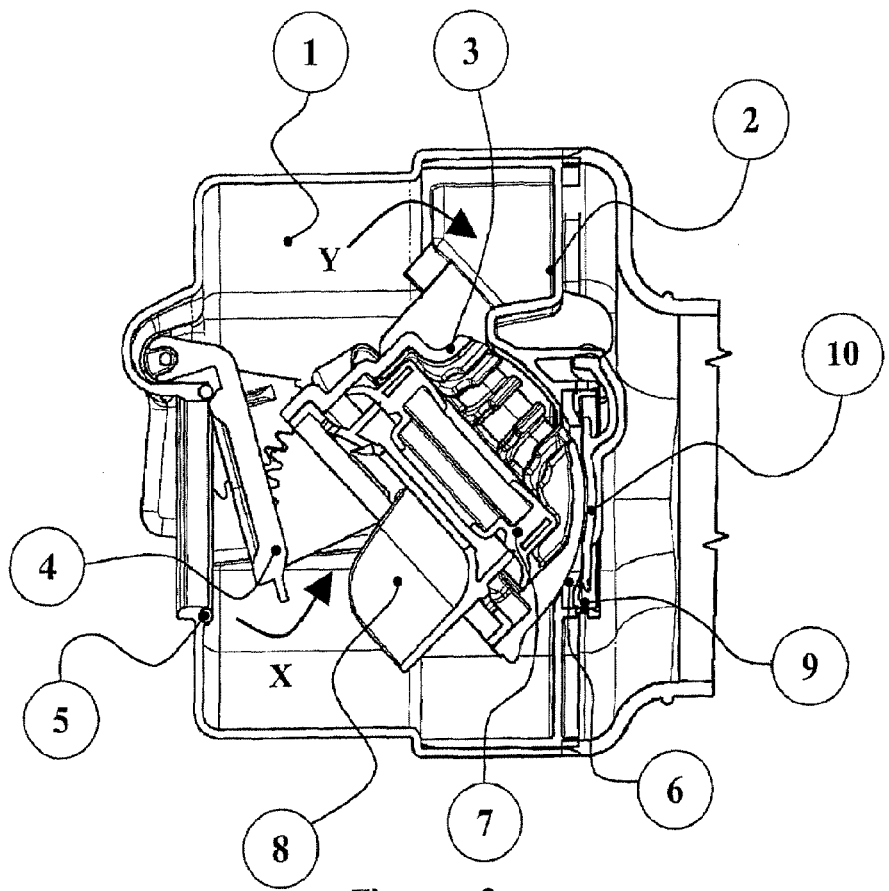
FIGS. 2 and 3 show, in vertical section, this same device when assembled, in which the plug respectively occupies two different intermediate positions between its closed position and its open position.
Figure 3:
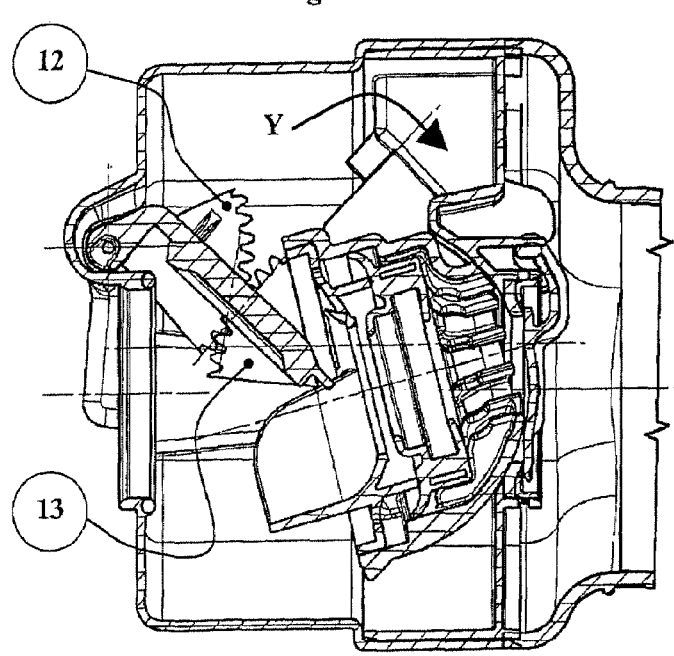

FIGS. 2 and 3 show the device in two successive and progressive opening phases of the flap 4 and of the plug 3. In FIG. 2, the device is in a phase approaching closing. In FIG. 3, the device is in a phase approaching opening.

Tilting the flap 4 and its pinion 12 in the direction of the arrow X (to free the inlet opening of the device) causes the plug 3 to rotate via its pinion 13 in the direction of the arrow Y so as to place it in the valve-opening position. When the plug 3 occupies this open position, the inlet cone 8 is in alignment with the outlet opening of the device (which is in contact with the pipe communicating with the tank (not shown) and which is normally closed off by the ULP flap 10), and also in alignment with the inlet opening of the device (which is normally closed off by the inlet flap 4).

When the device 1 is in the closed position (which is normally the case when the engine of the vehicle is operating), the flap 4 and the plug 3 respectively occupy their rest positions.

In order to supply the tank with a liquid fuel (for example petrol or diesel oil) using a filler nozzle, the flap 4 is pushed back into the upper casing 1 by means of the tubular end (spout) of the nozzle. Tilting the flap 4 and its pinion 12 causes corresponding rotation of the plug 3 via its pinion 13, the result of which is to place the inlet cone and the annular seal 7 in alignment with the inlet and outlet openings of the device. The tubular end of the nozzle may from this point forward be engaged through the cylindrical opening in the plug (delimited by the inlet cone 8), fit closely with the seal 7 and open the ULP flap 10 in order to enter the pipe (not shown) on condition that the said end has an appropriate diameter (less than or equal to that of the inlet cone 8).

When the nozzle end is withdrawn, the return springs 11 tend to return the flap 4 to the closed position of the device and the plug 3 to the closed position of the valve.

At rest, the passage diameter of the seal 7 is normally less than the outside diameter of the tubular end of the filler nozzle. The elastic reinforcements of the seal 7 thus grip the tubular nozzle end, providing sealing between this end and the immediate atmosphere upstream of the head of the pipe. The seal 7 in this way prevents volatile emanations from escaping from the vehicle tank to the outside.

It should be noted that the seal 6 also contributes to the sealing provision. The device represented in these figures thus includes 5 sealing points:

a first between the seal 5 and the inlet flap 4 so as to seal the system from dust; this seal must not be impermeable to hydrocarbons on account of its function.

a second between the seal 7 and the nozzle end during filling; this seal must not be impermeable to hydrocarbons on account of its temporary function.

a third between the plug 3 and the lower casing 2 via the seal 6; the latter performs the same function as the seal of the cap in the case of a system having a cap; this seal must be impermeable to hydrocarbons on account of its permanent function.

a fourth between the seal 6 and the ULP flap 10 so as to provide sealing for the whole system for the time that the plug is open; this seal must not be impermeable to hydrocarbons on account of its temporary function.

a fifth between the seal 7 and the plug 3 so as to provide sealing during filling of the same order as the lips on the nozzle end; this seal must not be impermeable to hydrocarbons on account of its temporary function.

By virtue of the presence of these 5 sealing points, both in normal operation (moving and stopping of the vehicle) and during refuelling operations, no vapour leaves the system. In fact, sealing at the ULP flap 10 is interrupted only when the nozzle end has caused the said flap to tilt. However, at that moment the seal 7 is operating.

Figure 4:
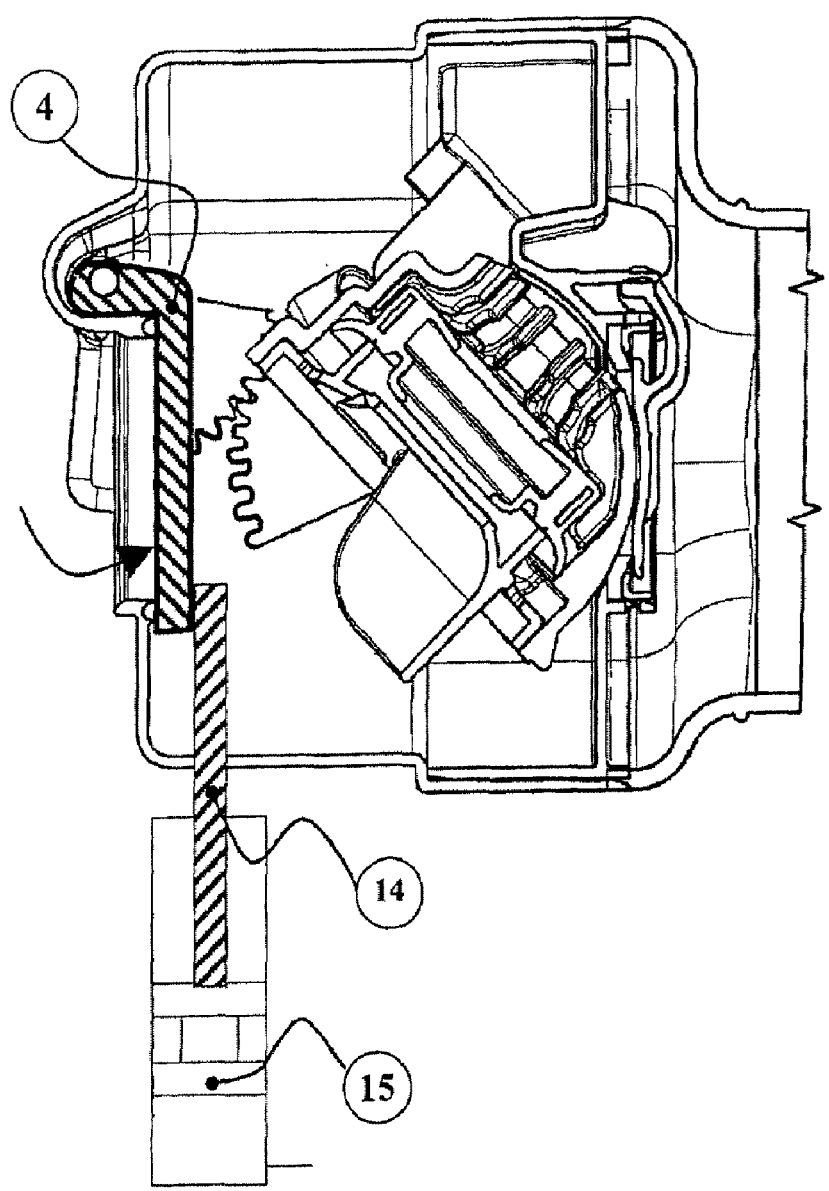
FIG. 4 illustrates a variant of the preceding system including a locking device.

In the variant illustrated in FIG. 4, the inlet flap 4 is locked by means of a cylinder actuator comprising a rod 14 and body 15. The rod 14 may be operated either manually by mechanical movement or by an electromechanical source. It is retracted (lowered into the body 15) upon opening of the vehicle doors or through the action of a hand lever situated within the vehicle or near the filling system, so as to allow the flap 4 to open freely and to enable a refuelling operation to take place. At the end of the operation and following withdrawal of the filler nozzle, the flap 4 closes again through the effect of the springs (not shown). The rod 14 of the cylinder actuator returns to its locking position (either automatically or through the effect of a mechanical or electromagnetic control) behind the flap 4 and thereby once more blocks entry to the system.

The invention claimed is:

1. A closure device for a filler pipe of a tank intended to contain a liquid, the device comprising:

a valve that includes a valve body in communication with the pipe and a plug that can be moved in the valve body between a closed position and an open position of the valve, wherein the body of the valve includes an inlet opening closed off by a flap that can be moved between an open position and a closed position, and an outlet opening, and wherein the flap is connected to the plug by a coupling such that a thrust exerted on the flap by a tubular end of a nozzle for admitting liquid into the tank causes the flap to tilt into the valve body and the plug to rotate, placing a cylindrical opening in the plug in alignment with inlet and outlet openings in the valve body.

2. A device according to claim 1, wherein the coupling device includes first and second engaging pinions, the first pinion being secured to the flap and the second pinion being secured to the plug.

3. A device according to claim 1, further comprising a locking device to allow locking/unlocking of the flap.

4. A device according to claim 1, wherein the outlet opening in the valve body is closed off by a second flap that can be moved between an open position and a closed position.

5. A device according to claim 4, wherein the second flap cooperates with a seal that contributes to sealing of the device as long as the second flap is in its closed position.

6. A device according to claim 1, wherein a seal is arranged in the valve and is not visible to a user unless the plug is in its open position.

7. A device according to claim 6, wherein the seal provides sealing between the pipe and a tubular end of a nozzle for admitting liquid into the tank during filling of the tank.

8. A device according to claim 7, wherein the seal is fixed in a cylindrical opening in the plug.

9. A device according to claim 6, wherein the seal includes a flexible sleeve.

10. A liquid-fuel tank of a vehicle with an internal combustion engine, equipped with a device according to claim 1.

* * * * *